(12) United States Patent
Erdmann et al.

(10) Patent No.: US 8,966,213 B2
(45) Date of Patent: Feb. 24, 2015

(54) GRANTING AND REVOKING SUPPLEMENTAL MEMORY ALLOCATION REQUESTS

(75) Inventors: Derek Logan Erdmann, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 13/548,161

(22) Filed: Jul. 12, 2012

(65) Prior Publication Data

US 2014/0019708 A1    Jan. 16, 2014

(51) Int. Cl.
*G06F 12/00* (2006.01)
*G06F 13/00* (2006.01)
*G06F 13/28* (2006.01)

(52) U.S. Cl.
USPC .......................................... 711/170; 711/159

(58) Field of Classification Search
CPC .................... G06F 9/5016; G06F 2009/45583; G06F 12/121
USPC .................................................. 711/159, 170
See application file for complete search history.

(56) References Cited

U.S. PATENT DOCUMENTS

| | | | |
|---|---|---|---|
| 7,565,507 B2 | 7/2009 | Wolf et al. | |
| 7,827,373 B2 | 11/2010 | Kaakani et al. | |
| 2007/0067776 A1* | 3/2007 | McCarthy et al. | 718/104 |
| 2007/0294501 A1* | 12/2007 | Wolf et al. | 711/170 |
| 2010/0318575 A1* | 12/2010 | Murphy et al. | 707/802 |
| 2010/0318745 A1* | 12/2010 | Wheeler et al. | 711/136 |
| 2011/0138147 A1* | 6/2011 | Knowles et al. | 711/170 |
| 2012/0117299 A1* | 5/2012 | Waldspurger et al. | 711/6 |

* cited by examiner

*Primary Examiner* — Ryan Bertram
(74) *Attorney, Agent, or Firm* — David W. Victor; Konrad Raynes Davda & Victor LLP (57) ABSTRACT

Provided are a computer program product, system, and method for granting and revoking supplemental memory allocation requests. Supplemental memory allocations of memory resources are granted to applications following initial memory allocations of the memory resources to the applications. In response to determining that available memory resources have fallen below an availability threshold, determining a weighting factor for each supplemental memory allocation based on at least one of an amount of the memory resources allocated to the supplemental memory allocation and a measured duration during which the memory resources have been allocated. At least one of the supplemental memory allocations is selected to revoke based on the determined weighting factors of the supplemental memory allocations.

25 Claims, 7 Drawing Sheets

FIG. 1

| 52 | 54 | 56 | 58 | 62 | 64 |
|---|---|---|---|---|---|
| ID | Job/ Application Name | Amount Allocated Memory | Start Time | Assigned Duration | Requested Duration |

Supplemental Memory Allocation

FIG. 2

| 72 | 74 | 76 | 78 | 80 |
|---|---|---|---|---|
| ID | Job/ Application Name | Allocated Memory Addresses | Measured Duration | Amount of Allocated Memory |

Historical Supplemental Memory Allocation

FIG. 3

| 92 | 94 | 96 | 98 |
|---|---|---|---|
| Supplemental Memory Request Command | Application Name | Requested Allocation Size | Requested Duration |

Supplement Memory Allocation Request

GRANTING AND REVOKING SUPPLEMENTAL MEMORY ALLOCATION REQUESTS

BACKGROUND OF THE INVENTION

1. Field of the Invention

The present invention relates to a computer program product, system, and method for granting and revoking supplemental memory allocation requests.

2. Description of the Related Art

An application may request a memory manager for an amount of memory to allocate for application operations. Lower priority applications may initially request a smaller amount of memory, but during high load time periods may require additional memory resources.

There is a need in the art for improved techniques to allocate memory resources to applications.

SUMMARY

Provided are a computer program product, system, and method for granting and revoking supplemental memory allocation requests. Supplemental memory allocations of memory resources are granted to applications following initial memory allocations of the memory resources to the applications. In response to determining that available memory resources have fallen below an availability threshold, determining a weighting factor for each supplemental memory allocation based on at least one of an amount of the memory resources allocated to the supplemental memory allocation and a measured duration during which the memory resources have been allocated. At least one of the supplemental memory allocations is selected to revoke based on the determined weighting factors of the supplemental memory allocations.

DETAILED DESCRIPTION

Described embodiments provide techniques for granting a requested supplemental memory allocation to an application after it has received an initial memory allocation. The supplemental memory allocation may be used for periods of heavy load. A duration during which the supplemental memory allocation is granted may be determined by considering previously granted supplemental memory allocations to the application requesting the current allocation. Further embodiments concern determining weighting factors for supplemental memory allocations to use to select one or more supplemental memory allocations to revoke when space is needed in memory.

Figure 1:
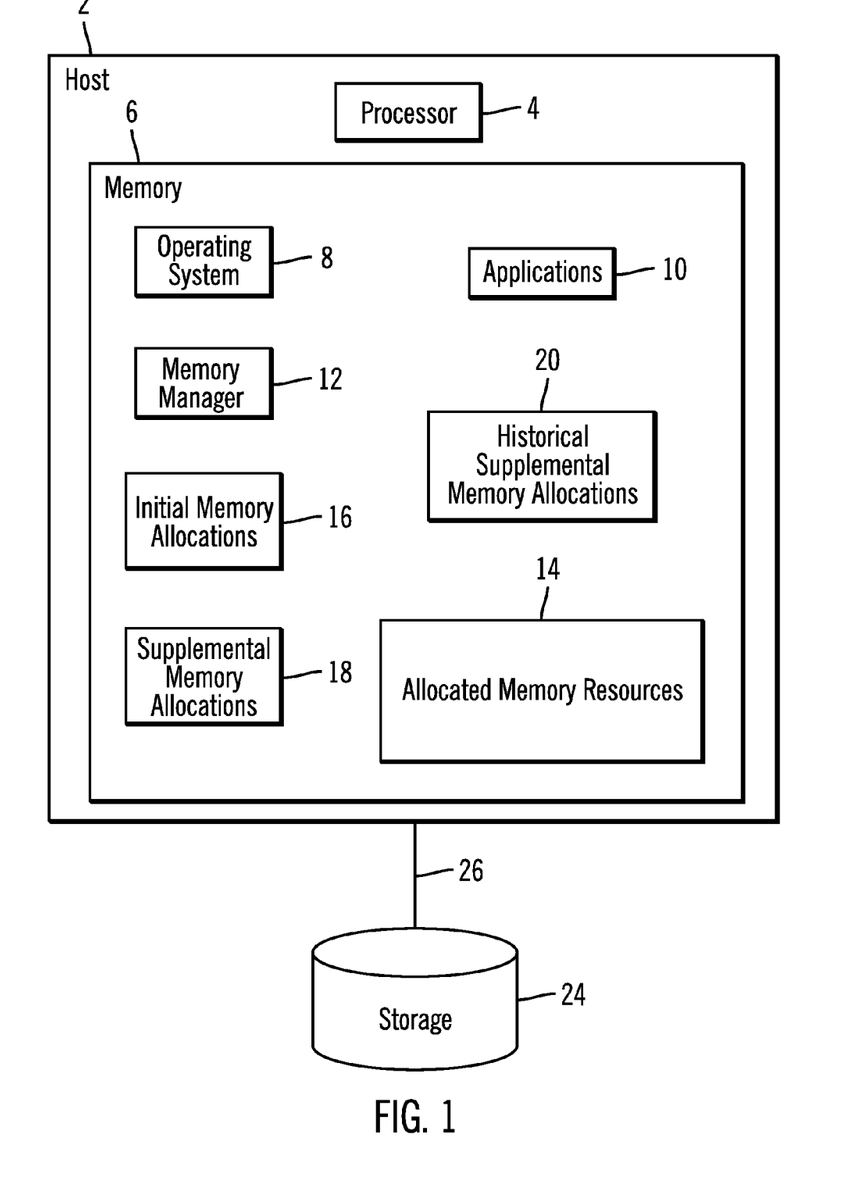
FIG. 1 illustrates an embodiment a computing environment.

FIG. 1 illustrates an embodiment of a computing environment. A host 2 includes a processor 4, which may comprise one or more processors and/or cores, and a memory 6 including programs executed by the processor 4, such as an operating system 8, an application 10, and a memory manager 12. The memory manager 12 may manage the allocation of memory resources, e.g., memory addresses, in allocated memory resources 14 in the memory 6 to the applications 10, initial memory allocations 16, supplemental memory allocations 18, and historical supplemental memory allocations 20. The memory manager 12 may further be implemented in a memory controller or other hardware devices or a combination of hardware and software executed by the processor 4.

The initial memory allocation 14 comprises an initial allocation of memory resources to applications 10, such as when the applications 10 are loaded into the memory 6. The supplemental memory allocations 18 comprise additional memory resources currently granted to applications 10 following the initial memory allocations 16, such as a if low priority application 10 needs further resources during heavy load times for the application 10. The historical supplemental memory allocations 20 comprise previous supplemental memory allocations 18 that have been released. The supplemental memory allocations 18 indicate active allocations that have not been released by the requesting applications 10.

The allocated memory resources 14 store data from applications 10 in the host 2 and from applications remote with respect to the host 2, such as in different client or server systems that communicate with the host 2 over a network (not shown). The memory space 14 may further store data used by the host operating system 8, such as system state information.

In one embodiment, the memory 6 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The host 2 may comprise a computational device known in the art, such as a workstation, mainframe, server, etc. The host 2 may communicate Input/Output (I/O) requests to a control unit for the storage 24, such as a storage subsystem or server, such as an enterprise storage server, storage controller, etc., or other device used to manage I/O requests to attached volumes. The storage 24 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The host 2 communicates with the storage 24 via a connection 26. The connection 26 may comprise a network such as a Local Area Network (LAN), Storage Area Network (SAN), Wide Area Network (WAN), peer-to-peer network, wireless network, etc. Alternatively, the connection 26 may comprise a bus interface, such as a Peripheral Component Interconnect (PCI) bus or serial interface. The operating system 8 may comprise suitable operating systems known in the art, such as the International Business Machines ("IBM®") Z/OS® operating system. (IBM and Z/OS are trademarks of IBM in the United States and foreign countries).

Programs and data loaded in the memory 6 for execution by the processor 4 may be stored in the storage 24 and loaded from the storage 24 into the memory 6 as needed.

The operating system 8 receives data requests from the applications 10. The applications 6 may include middleware, access methods, and independent software vendor (ISV) products. The host 2 may also receive I/O requests from applications on systems over a network.

Figure 2:
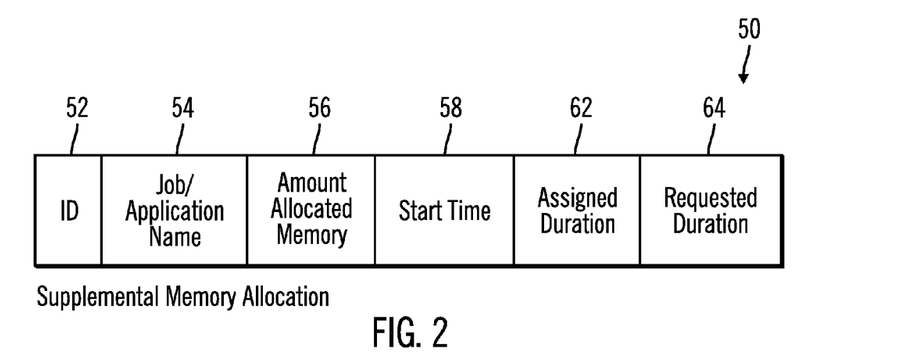
FIG. 2 illustrates an embodiment of a supplemental memory allocation.

FIG. 2 illustrates an embodiment of an instance of a supplemental memory allocation 50 included in the supplemental memory allocations 18. A supplemental memory allocation 50 data structure includes a unique identifier (ID) 50; a job/application name 54 of the job/application 10 that initiated the request for the supplemental memory allocation 50; an amount of allocated memory 56, e.g., address range, block size, tracks, etc., a start time 58 at which the allocation began; an assigned duration 62 for which the supplemental memory allocation 50 is granted; and a requested duration 64 indicating the duration requested by the application 54 for the supplemental memory allocation 50.

In certain embodiments, if the application 54 did not request a duration 64, then the assigned duration 62 may be zero, indicating that the supplemental memory allocation 50 may be immediately revoked in order to free memory space 14 if the available application memory space 14 falls below an availability threshold.

Figure 3:
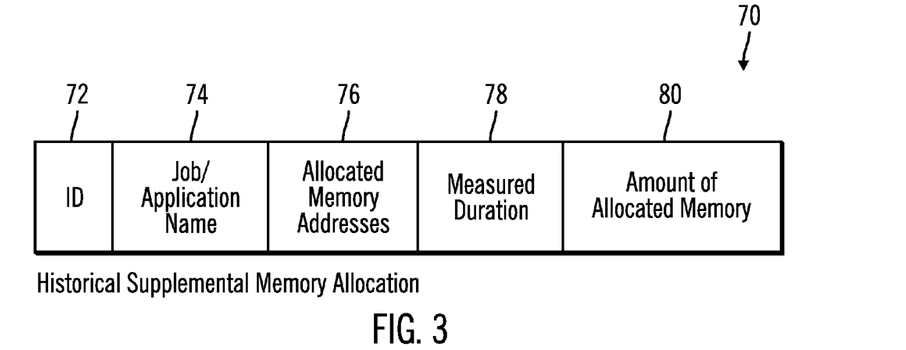
FIG. 3 illustrates an embodiment of a historical supplemental memory allocation.

FIG. 3 illustrates an embodiment of a historical a supplemental memory allocation 70 included in the historical supplemental memory allocations 20. A historical supplemental memory allocation 70 data structure includes a unique identifier (ID) 70; a job/application name 74 of the job/application 10 that initiated the request for the expired supplemental memory allocation 50; allocated memory addresses 76 allocated to the application 74 for the request; a measured duration 78 during which the supplemental memory allocation was held; and an amount of the allocated memory 80 held during the measured duration 78 by the application 74. In z/OS embodiments, the historical previous supplemental memory allocations may be determined from System Management Facility (SMF) 78 type 2 records.

Figure 4:
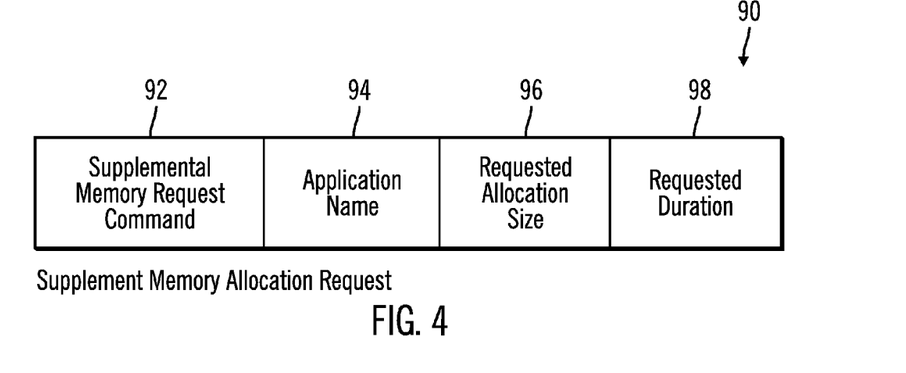
FIG. 4 illustrates an embodiment of a supplemental memory allocation request.

FIG. 4 illustrates an embodiment of a supplemental memory allocation request 90 that the applications 10 may submit to the memory manager 12 to request a supplement memory allocation 50. The request 90 includes a supplemental memory request command 92. In the IBM z/OS operating system implementations, the command 92 may comprise a GETMAIN request that includes a parameter indicating that the request is for a supplemental memory allocation. The request 90 further includes an application name 94 of the application/job 10 initiating the request; a request allocation size 96; and a requested duration 98. As discussed, the requested duration 98 is optional and may not specify a specific duration.

Further embodiments of the supplemental memory allocation 50 (FIG. 2), historical supplemental memory allocation 70 (FIG. 3), and supplemental memory allocation request 90 (FIG. 4) may include additional and different information than shown in FIGS. 2, 3, and 4, and may not include certain of the information shown in FIGS. 2, 3, and 4.

Figure 5:
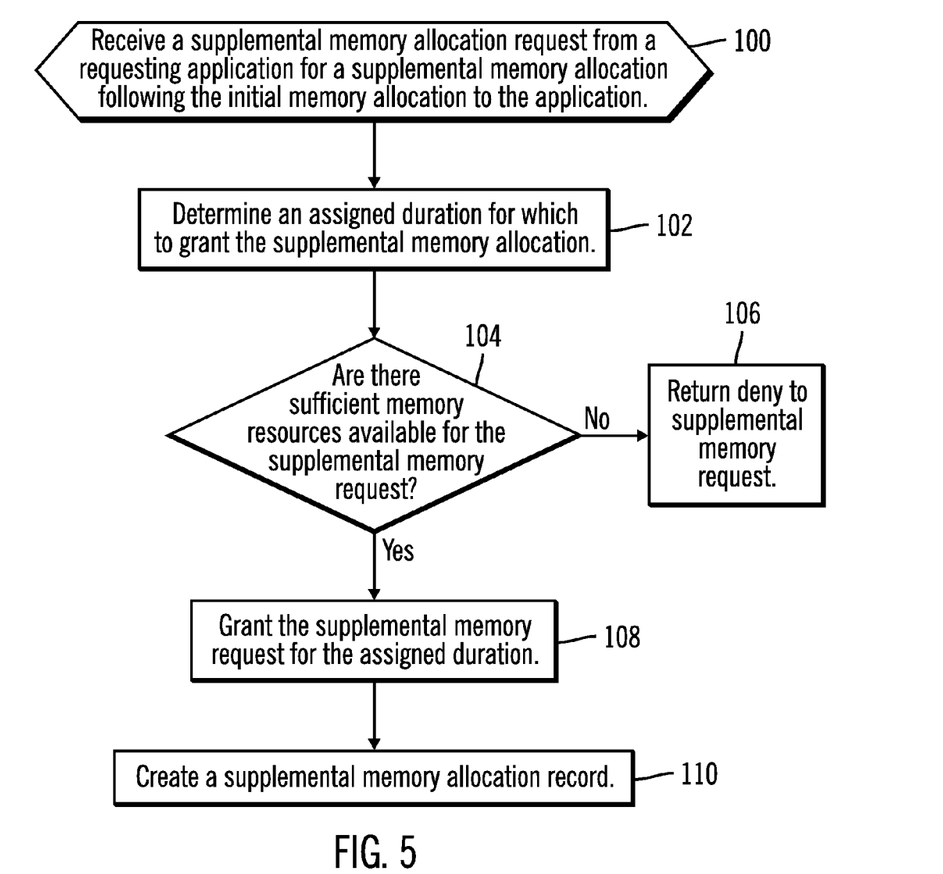
FIG. 5 illustrates an embodiment of operations to process a supplemental memory allocation request.

FIG. 5 illustrates an embodiment of operations performed by the memory manager 12 to process a supplemental memory request 90 (FIG. 4) from an application 10 in the host 2 or from an application remote with respect to the host 2 following the initial memory allocation to the application 10. Upon receiving (at block 100) the supplemental memory request 90, the memory manager 12 determines (at block 102) an assigned duration 62 for which to grant the requested supplemental memory allocation 50. If (at block 104) there are not sufficient memory resources 14 available for the supplemental memory request 90, then the memory manager 12 returns (at block 106) a deny to the supplemental memory request 106. In certain embodiments, the request 90 may be denied if the expected available memory resources 14 during the assigned duration 62 are less than a threshold amount, e.g., 20%. If (at block 104) there are sufficient available memory resources 14, then the supplemental memory request 90 is granted (at block 108) and a supplemental memory allocation record 50 is created in the supplemental memory allocations 18 with all the accompanying information. A supplemental memory allocation record 50 is created (at block 110) to include in the supplemental memory allocations 18.

Figure 6:
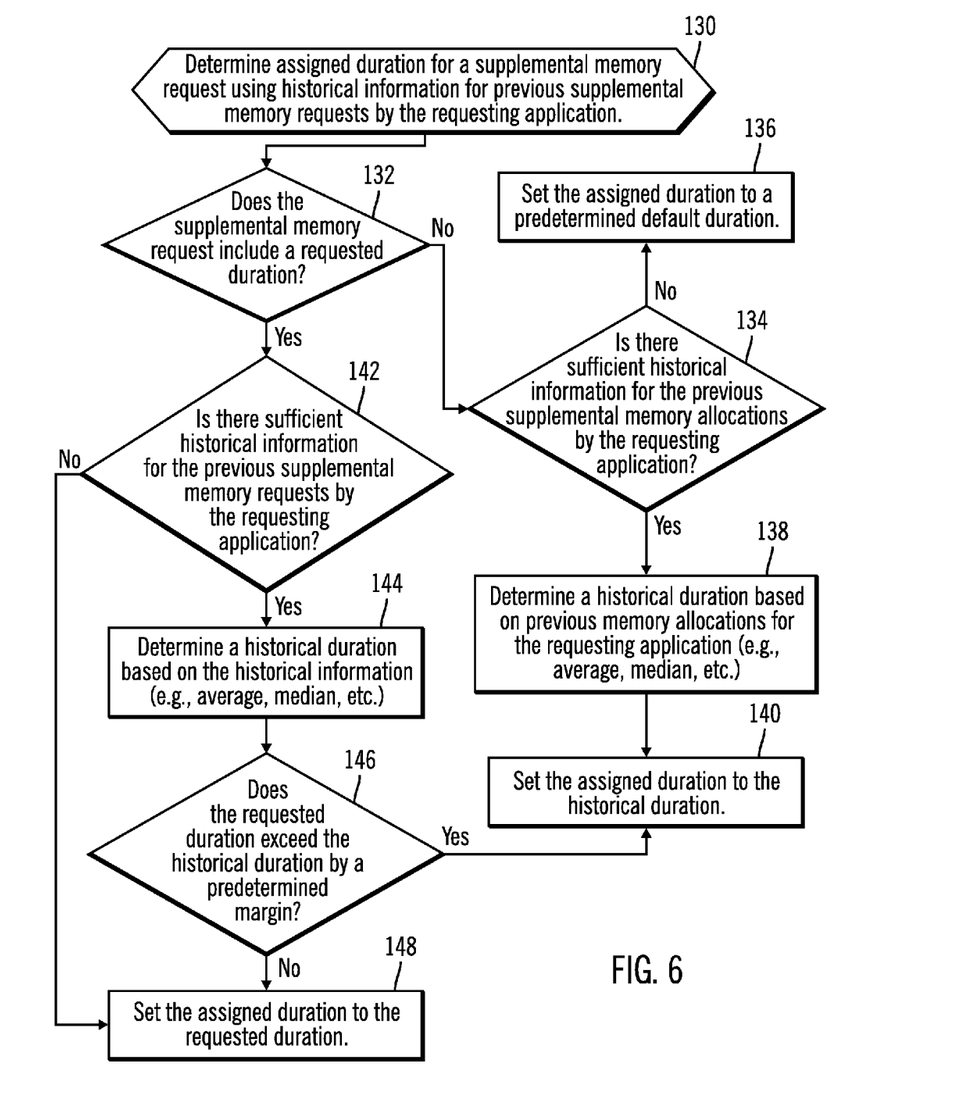
FIG. 6 illustrates an embodiment of operations to determine an assigned duration for a supplemental memory allocation

FIG. 6 illustrates an embodiment of operations performed by the memory manager 12 to determine the assigned duration 62 for a supplemental memory request 90 using historical information 20 on supplemental memory allocations 70 for the requesting application 94. In certain embodiments, the operations of FIG. 6 may comprise the operation performed at block 102 in FIG. 5 to determine the assigned duration 62. In alternative embodiments, other operations may be performed to determine the assigned duration 62. Upon initiating (at block 130) the determination of the assigned duration 62, the memory manager 12 determines (at block 132) whether the supplemental memory request 90 includes a requested duration 92. If not, then the memory manager 12 determines (at block 134) whether there is sufficient historical information for the previous supplemental memory allocations 70 by the requesting application 94 of the current request 90. For instance, the memory manager 12 may require a minimum number of historical previous supplemental memory allocations 70 before relying on the historical information 20. If (at block 134) there are not a sufficient number of previous supplemental memory allocations 70 for the requesting application 94, then the assigned duration 62 is set (at block 136) to a predetermined default duration. If (at block 134) there are a sufficient number of previous supplemental memory allocations 70, e.g., historical information 20 is sufficient, then the memory manager 12 determines a historical duration based on the previous memory allocations 70 for the requesting application 94. For instance, in one embodiment, the historical duration may comprise an average or median of the measured durations 78 in the previous supplemental memory allocations 70 for the requesting application 94 plus two standard deviations of the measured durations 78. The assigned duration 62 is set (at block 140) to the calculated historical duration.

If (at block 132) the supplemental memory request 90 includes a requested duration 98 and if (at block 142) there is sufficient historical information 20, e.g., a threshold number of previous supplemental memory allocations 70 for the requesting application 94, then the memory manager 12 determines (at block 144) the historical duration, such as determined at block 138. If (at block 146) the requested duration 98 exceeds the calculated historical duration by a predetermined margin, then the assigned duration 62 is set (at block 140) to the historical duration. Otherwise, if the requested duration 98 does not exceed the historical duration by the margin, then the assigned duration is set (at block 148)

to the requested duration 98. For instance, the margin may be set to 20%, so that the requested duration 98 is used if it does not exceed the calculated historical duration by the margin. With the described embodiments, the duration during which the request for supplemental memory is granted is limited by historical supplemental memory allocations 70.

Figure 7:
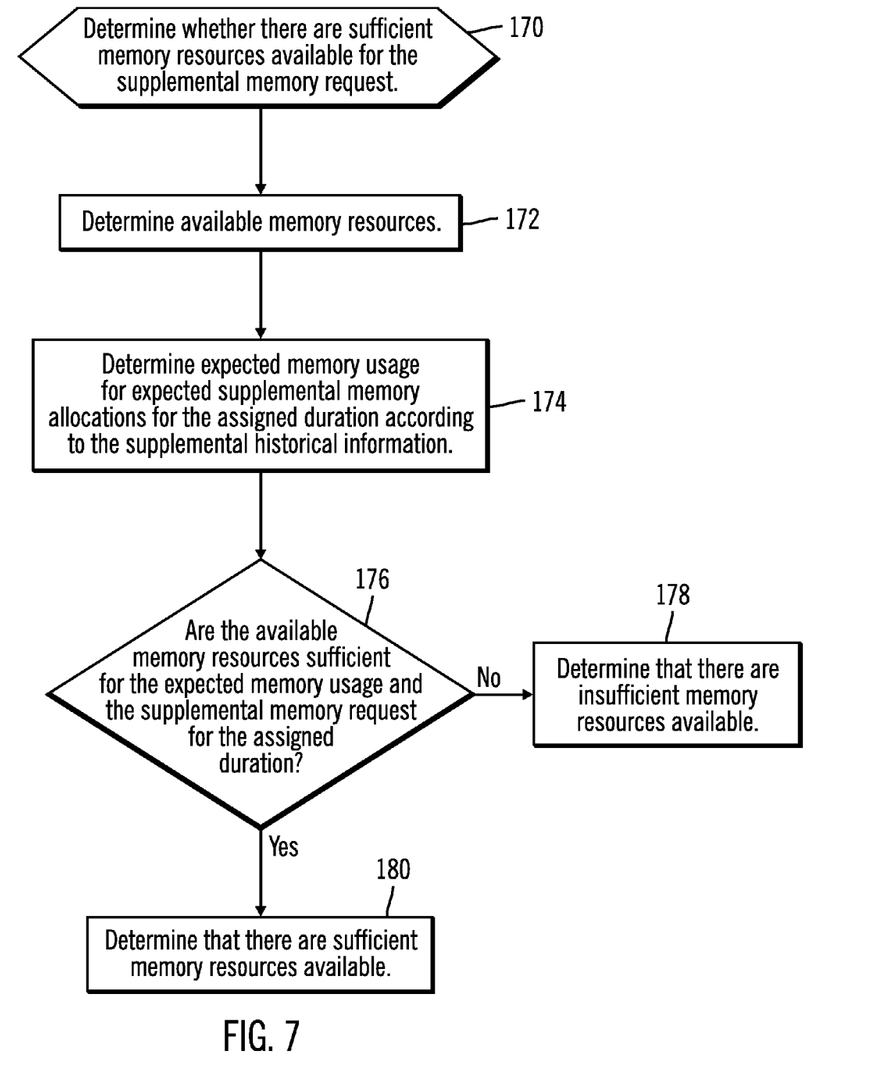
FIG. 7 illustrates an embodiment of operations to determine whether there are sufficient memory resources available for a supplemental memory request.

FIG. 7 illustrates an embodiment of operations performed by the memory manager 12 to determine whether there are sufficient memory resources 14 available for the supplemental memory request 90. In certain embodiments, the operations of FIG. 7 may comprise the operation performed at block 104 in FIG. 5 to determine whether there are sufficient available memory resources 14. Upon initiating (at block 170) the operation to determine whether there are sufficient available memory resources 14, the memory manager 12 determines (at block 172) the current available memory resources 12, e.g., unused memory available for applications 10. The memory manager 12 determines (at block 174) expected memory usage for expected supplemental memory allocations for all applications for the assigned duration 62 according to the supplemental historical information 20. For instance, the memory manager 12 may examine the supplemental memory allocations 70 to determine previous supplemental allocations that have been granted during the assigned duration 62 to determine the expected usage during the duration 62, such as allocations to applications that previously requested memory allocations during the duration to assign to the current memory allocation request 90.

If (at block 176) available memory resources are not sufficient for the expected memory usage and the supplemental memory request for the requested size 96 for the assigned duration 62, then the determination is made (at block 178) that there are insufficient memory resources 14 available. Otherwise, if (at block 176) available memory resources are sufficient to accommodate both the expected memory usage and the requested allocation of the requested size 96 for the assigned duration 62, then the determination is made (at block 180) that there are sufficient memory resources 14 for the request. The determination of sufficient resources may require that the available memory resources 14 be enough to accommodate the expected usage and the requested allocation and have a remaining amount of available resources or "cushion", e.g., 20%.

Figure 8:
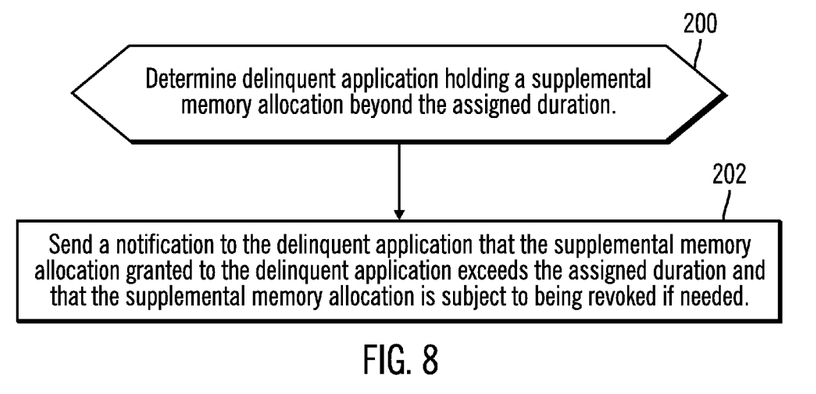
FIG. 8 illustrates an embodiment of operations to send notifications to delinquent applications holding a supplemental memory allocation beyond the assigned duration.

FIG. 8 illustrates an embodiment of operations performed by the memory manager 12 to notify delinquent applications 10 that they are holding allocated memory resources beyond the assigned duration 62. Upon determining (at block 200) a delinquent application 10 holding a supplemental memory allocation 50 (FIG. 2) beyond the assigned duration 62, the memory manager 12 may send (at block 202) a notification to the delinquent application 10 that the supplemental memory allocation 50 granted to the delinquent application 10 exceeds the assigned duration 62 and that the supplemental memory allocation is subject to being revoked if memory resources 14 are needed for initial memory allocations or higher priority applications. In alternative embodiments, the notification may be sent if the supplemental memory allocation 50 has been held beyond a requested duration 64.

Figure 9:
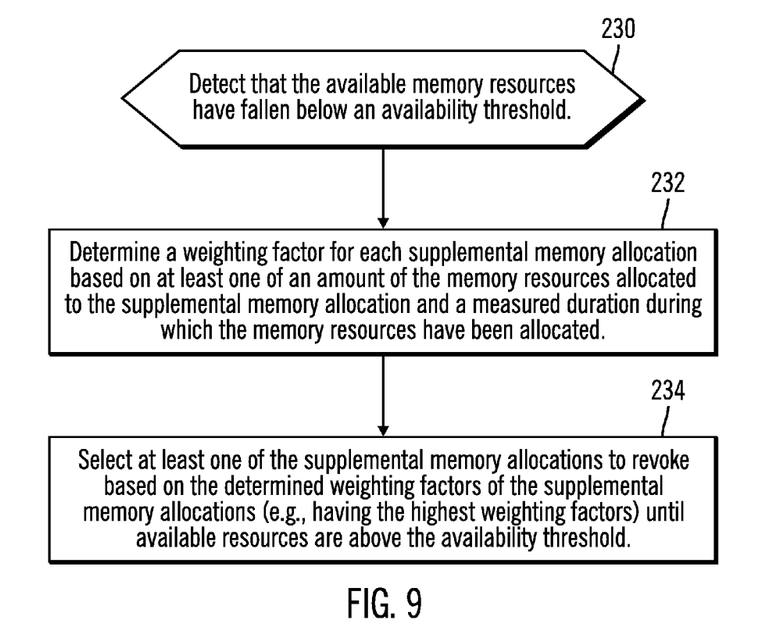
FIG. 9 illustrates an embodiment of operations performed when available memory resources have fallen below an availability threshold.

FIG. 9 illustrates an embodiment of operations performed by the memory manager 12 when available memory resources 14 fall below an acceptable threshold. Upon detecting (at block 230) that available memory resources have fallen below an availability threshold, the memory manager 12 determines (at block 232) a weighting factor for each active supplemental memory allocation 50 (FIG. 2) based on at least one of an amount of the memory resources 56 allocated to the supplemental memory allocation and a measured duration during which the memory resources 14 have been allocated, such as a time since the start time 58 of the granting of the allocation. The weighting factor may be calculated from one or more of the amount of the memory resources allocated 56, the measured duration of the supplemental memory allocation 50, e.g., time elapsed since the start time 58, a duration by which the application 54 has held the allocation 50 beyond the assigned duration 62, and/or whether the application 54 requested a duration 98. The memory manager 12 selects (at block 234) at least one of the supplemental memory allocations 50 to revoke based on the determined weighting factors of the supplemental memory allocations (e.g., having the highest weighting factors) until available resources are above the availability threshold. The applications 10 whose allocations 50 are selected for revocation may be notified before the revocation takes effect so they may take actions, such as saving current information in the allocated memory resources 14 and state information.

Figure 10:
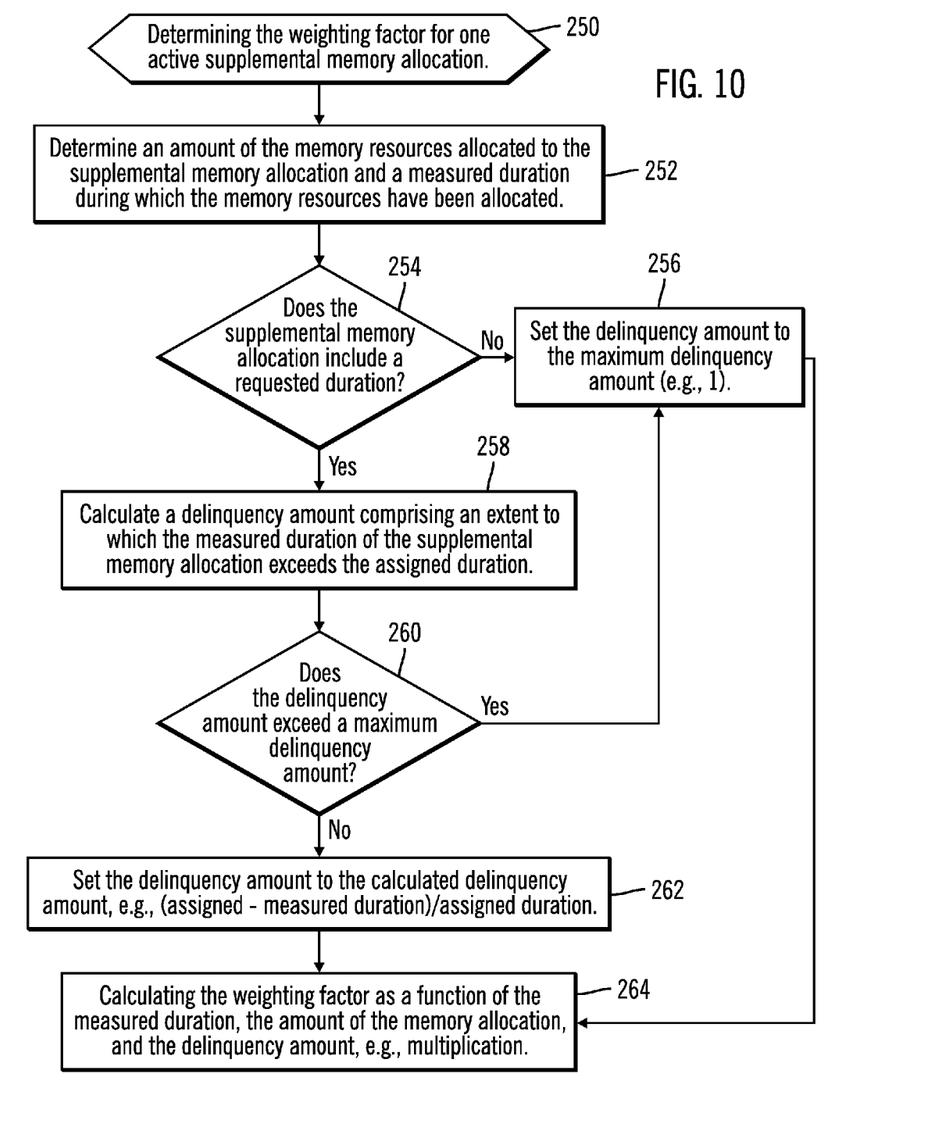
FIG. 10 illustrates an embodiment of operations to determine a weighting factor for supplemental memory allocations which is used to select a supplemental memory allocation to revoke.

FIG. 10 illustrates an embodiment of operations performed by the memory manager 12 to calculate the weighting factor. In certain embodiments, the operations of FIG. 10 may be performed at block 232 in FIG. 9 to determine the weighting factors used to select the supplemental memory allocations 50 to revoke. Upon initiating (at block 250) the operation to determine the weighting factor, the memory manager 12 determines (at block 252) an amount of the memory resources 56 allocated to the supplemental memory allocation and a measured duration during which the memory resources have been allocated, which may comprise a time that has elapsed since a start time 58 of the supplemental memory allocation 64 being considered. The memory manager 12 determines (at block 254) whether the supplemental memory allocation 50 includes a requested duration 64. If not, then the delinquency amount is set (at block 256) to a maximum delinquency amount.

The delinquency amount reflects an adjustment value based on an amount by which the measured duration over which the supplemental memory allocation 50 is held exceeds the assigned duration 62, such that allocations 50 having a higher calculated delinquency amount are relatively more eligible candidates for revocation because they have been held beyond their allotted time, e.g., assigned duration 62. A maximum delinquency amount may indicate that a supplemental memory allocation is subject to immediate revocation. Allocations 50 that do not have a requested duration may be assumed to be immediately revocable and thus assigned the maximum delinquency amount. In certain embodiments, the delinquency amount may comprise a maximum amount, such as one (100%) or the percentage by which the measured duration exceeds the assigned duration 62 as a percentage of the assigned duration 62. In this way, the weighting factor is reduced if the duration by which the application 54 is delinquent is lower, has a lower delinquency amount percentage. In alternative embodiments, the delinquency amount may be calculated with respect to the requested duration 64 instead of the assigned duration 62.

If (at block 254) the supplement memory allocation includes a requested duration 64, which was provided with the supplemental request 90, then the memory manager 12 calculates (at block 258) the delinquency amount as an extent to which the measured duration of the supplemental memory allocation exceeds the assigned duration. As mentioned, the extent may comprise a ratio of the amount by which the measured duration exceeds the assigned 62 (or requested) duration as a percentage of the assigned 62 (or requested) duration. If (at block 260) the calculated delinquency amount exceeds (at block 260) the maximum delinquency amount, then control proceeds to block 256 to set the delinquency amount to the maximum delinquency amount. Otherwise, if (at block 260) the delinquency amount does not exceed a maximum, then the delinquency amount is set (at block 262) to the calculated delinquency amount, e.g., (assigned−measured duration)/assigned duration. After setting the delinquency amount (at block 246 or 262), the weighting factor is calculated (at block 264) as a function of the measured duration, the amount of the memory allocation, and the delinquency amount, such as multiplying these values. If multiplication is used, then a higher weighting factor indicates that the supplemental memory allocation has a higher degree of eligibility for revocation. In multiplication embodiments, a higher weighting factor indicates that the supplemental memory allocation has at least been held longer, requires a greater amount of memory resources, has been held more time than the allotted time (assigned duration) and/or requested the allocation without a requested duration.

Described embodiments provide techniques to determine how to allocate supplement memory allocations to applications requesting additional memory resources after an initial memory allocation. To revoke a supplemental memory allocation, described embodiments consider various factors such as the amount of the allocation, the duration of the allocation, and an extent to which the allocation has been held beyond an assigned or requested duration. Further, described embodiments provide techniques for determining whether to grant a supplemental memory allocation request that considers the availability of memory resources in view of expected memory usage during the duration for which the requested memory allocation will be granted.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for allocating memory resources in a memory system to applications, the computer program product comprising a computer readable storage medium having computer readable program code embodied therein that executes to perform operations, the operations comprising:
   granting supplemental memory allocations of the memory resources to applications following initial memory allocations of the memory resources to the applications;
   determining that available memory resources have fallen below an availability threshold;
   in response to determining that the available memory resources have fallen below the availability threshold, determining a weighting factor for each supplemental memory allocation based on at least one of an amount of the memory resources allocated to the supplemental memory allocation and a measured duration during which the memory resources have been allocated; and
   selecting at least one of the supplemental memory allocations to revoke based on the determined weighting factors of the supplemental memory allocations.

2. The computer program product of claim 1, wherein the weighting factor is based on both the amount of the memory resources allocated and the measured duration of the supplemental memory allocation, wherein supplemental memory allocations having a relatively higher amount of memory resources allocated and measured duration tend to be selected to revoke.

3. The computer program product of claim 1, wherein determining the weighting factor for each supplemental memory allocation comprises:
   determining an assigned duration during which the supplemental memory allocation was granted to the application; and
   calculating a delinquency amount comprising an extent to which the measured duration of the supplemental memory allocation exceeds the assigned duration, wherein the weighting factor is additionally based on the delinquency amount.

4. The computer program product of claim 3, wherein the determining the delinquency amount comprises:
   determining whether the calculated delinquency amount exceeds a maximum delinquency amount;
   setting the delinquency amount to the calculated delinquency amount in response to determining that the delinquency amount does not exceed the maximum delinquency amount;
   setting the delinquency amount to the maximum delinquency amount in response to determining that the determined delinquency amount exceeds the maximum delinquency amount; and
   setting the delinquency amount to the maximum delinquency amount in response to determining that a supplemental memory request for the supplemental memory allocation did not include a requested duration.

5. The computer program product of claim 4, wherein the calculated delinquency amount comprises a difference of the measured duration and the assigned duration as a percentage of the assigned duration, wherein the weighting factor is calculated by multiplying the amount of the memory allocation, the delinquency amount, and the measured duration, wherein the selected supplemental memory allocation to revoke comprises the supplemental memory allocation having a highest weighting factor.

6. The computer program product of claim 1, wherein the operations further comprise:

receiving a supplemental memory request from a requesting application for a supplemental memory allocation following the initial memory allocation to the application;

determining whether there are sufficient memory resources available for the supplemental memory request; and in response to determining that there are sufficient memory resources available, performing:

determining an assigned duration for the supplemental memory allocation; and     granting the supplemental memory request for the assigned duration.

7. The computer program product of claim 6, wherein the operations further comprise:

maintaining supplemental historical information indicating previous supplemental memory allocations of the memory resources,     wherein the determining of whether there are sufficient memory resources available for the supplemental memory request comprises:

determining available memory resources;

determining expected memory usage for expected supplemental memory allocations for the assigned duration according to the supplemental historical information; and         determining that the available memory resources are sufficient in response to determining that the available memory resources are sufficient for the expected memory usage and the supplemental memory request for the assigned duration.

8. The computer program product of claim 6, wherein granting the supplemental memory request comprises:

maintaining supplemental historical information indicating previous supplemental memory allocations of the memory resources;

determining in the historical information previous supplemental memory allocations to the requesting application; and     using the determined previous supplemental memory allocations to determine the assigned duration.

9. The computer program product of claim 8, wherein the using of the determined previous supplemental memory allocations comprises:

determining whether the supplemental memory request includes a requested duration;

setting the assigned duration to a historical duration based on the determined previous supplemental memory allocations in response to determining that the supplemental memory request does not include the requested duration; and     in response to determining that the supplemental memory request includes the requested duration, performing:

setting the determined duration to the requested duration in response to determining that the requested duration does not exceed the historical duration by a predetermined margin; and         setting the determined duration to the historical duration in response to determining that the requested duration exceeds the historical duration by the predetermined margin.

10. The computer program product of claim 8, wherein granting the supplemental memory request comprises:

determining whether the supplemental memory request includes a requested duration;

setting the assigned duration to the requested duration in response to determining that supplemental memory requests includes the requested duration and that there is insufficient historical information of previous supplemental memory allocations for the requesting application; and     setting the assigned duration to a predetermined default duration in response to determining that supplemental memory requests does not include the requested duration and that there is insufficient historical information of previous supplemental memory allocations for the requesting application.

11. The computer program product of claim 1, wherein the supplemental memory allocations are granted to the applications for assigned durations, wherein the operations further comprise:

determining a delinquent application comprising one of the applications that continues to use the memory resources of the supplemental memory allocation following an expiration of the assigned duration; and     sending a notification to the delinquent application that the supplemental memory allocation granted to the delinquent application exceeds the assigned duration and that the supplemental memory allocation is subject to being revoked.

12. A system for allocating memory resources to applications, comprising:

at least one memory device having memory resources;

a computer readable storage medium implementing a memory manager executed to perform operations, the operations comprising:

granting supplemental memory allocations of the memory resources to applications following initial memory allocations of the memory resources to the applications;

determining that available memory resources have fallen below an availability threshold;

in response to determining that the available memory resources have fallen below the availability threshold, determining a weighting factor for each supplemental memory allocation based on at least one of an amount of the memory resources allocated to the supplemental memory allocation and a measured duration during which the memory resources have been allocated; and         selecting at least one of the supplemental memory allocations to revoke based on the determined weighting factors of the supplemental memory allocations.

13. The system of claim 12, wherein determining the weighting factor for each supplemental memory allocation comprises:

determining an assigned duration during which the supplemental memory allocation was granted to the application; and     calculating a delinquency amount comprising an extent to which the measured duration of the supplemental memory allocation exceeds the assigned duration, wherein the weighting factor is additionally based on the delinquency amount.

14. The system of claim 13, wherein the determining the delinquency amount comprises:

determining whether the calculated delinquency amount exceeds a maximum delinquency amount;

setting the delinquency amount to the calculated delinquency amount in response to determining that the delinquency amount does not exceed the maximum delinquency amount;

setting the delinquency amount to the maximum delinquency amount in response to determining that the determined delinquency amount exceeds the maximum delinquency amount; and setting the delinquency amount to the maximum delinquency amount in response to determining that a supplemental memory request for the supplemental memory allocation did not include a requested duration.

15. The system of claim 12, wherein the operations further comprise:
receiving a supplemental memory request from a requesting application for a supplemental memory allocation following the initial memory allocation to the application;
determining whether there are sufficient memory resources available for the supplemental memory request; and
in response to determining that there are sufficient memory resources available, performing:
determining an assigned duration for the supplemental memory allocation; and
granting the supplemental memory request for the assigned duration.

16. The system of claim 15, wherein the operations further comprise:
maintaining supplemental historical information indicating previous supplemental memory allocations of the memory resources,
wherein the determining of whether there are sufficient memory resources available for the supplemental memory request comprises:
determining available memory resources;
determining expected memory usage for expected supplemental memory allocations for the assigned duration according to the supplemental historical information; and
determining that the available memory resources are sufficient in response to determining that the available memory resources are sufficient for the expected memory usage and the supplemental memory request for the assigned duration.

17. The system of claim 15, wherein granting the supplemental memory request comprises:
maintaining supplemental historical information indicating previous supplemental memory allocations of the memory resources;
determining in the historical information previous supplemental memory allocations to the requesting application; and
using the determined previous supplemental memory allocations to determine the assigned duration.

18. The system of claim 17, wherein the using of the determined previous supplemental memory allocations comprises:
determining whether the supplemental memory request includes a requested duration;
setting the assigned duration to a historical duration based on the determined previous supplemental memory allocations in response to determining that the supplemental memory request does not include the requested duration; and
in response to determining that the supplemental memory request includes the requested duration, performing:
setting the determined duration to the requested duration in response to determining that the requested duration does not exceed the historical duration by a predetermined margin; and
setting the determined duration to the historical duration in response to determining that the requested duration exceeds the historical duration by the predetermined margin.

19. A method, comprising:
granting supplemental memory allocations of memory resources in at least one memory device to applications following initial memory allocations of the memory resources to the applications;
determining that available memory resources have fallen below an availability threshold;
in response to determining that the available memory resources have fallen below the availability threshold, determining a weighting factor for each supplemental memory allocation based on at least one of an amount of the memory resources allocated to the supplemental memory allocation and a measured duration during which the memory resources have been allocated; and
selecting at least one of the supplemental memory allocations to revoke based on the determined weighting factors of the supplemental memory allocations.

20. The method of claim 19, wherein determining the weighting factor for each supplemental memory allocation comprises:
determining an assigned duration during which the supplemental memory allocation was granted to the application; and
calculating a delinquency amount comprising an extent to which the measured duration of the supplemental memory allocation exceeds the assigned duration, wherein the weighting factor is additionally based on the delinquency amount.

21. The method of claim 20, wherein the determining the delinquency amount comprises:
determining whether the calculated delinquency amount exceeds a maximum delinquency amount;
setting the delinquency amount to the calculated delinquency amount in response to determining that the delinquency amount does not exceed the maximum delinquency amount;
setting the delinquency amount to the maximum delinquency amount in response to determining that the determined delinquency amount exceeds the maximum delinquency amount; and
setting the delinquency amount to the maximum delinquency amount in response to determining that a supplemental memory request for the supplemental memory allocation did not include a requested duration.

22. The method of claim 19, further comprising:
receiving a supplemental memory request from a requesting application for a supplemental memory allocation following the initial memory allocation to the application;
determining whether there are sufficient memory resources available for the supplemental memory request; and
in response to determining that there are sufficient memory resources available, performing:
determining an assigned duration for the supplemental memory allocation; and
granting the supplemental memory request for the assigned duration.

23. The method of claim 22, further comprising:
maintaining supplemental historical information indicating previous supplemental memory allocations of the memory resources,
wherein the determining of whether there are sufficient memory resources available for the supplemental memory request comprises:

determining available memory resources;

determining expected memory usage for expected supplemental memory allocations for the assigned duration according to the supplemental historical information; and determining that the available memory resources are sufficient in response to determining that the available memory resources are sufficient for the expected memory usage and the supplemental memory request for the assigned duration.

24. The method of claim 22, wherein granting the supplemental memory request comprises:

maintaining supplemental historical information indicating previous supplemental memory allocations of the memory resources;

determining in the historical information previous supplemental memory allocations to the requesting application; and using the determined previous supplemental memory allocations to determine the assigned duration.

25. The method of claim 24, wherein the using of the determined previous supplemental memory allocations comprises:

determining whether the supplemental memory request includes a requested duration; and setting the assigned duration to a historical duration based on the determined previous supplemental memory allocations in response to determining that the supplemental memory request does not include the requested duration;

in response to determining that the supplemental memory request includes the requested duration, performing:

setting the determined duration to the requested duration in response to determining that the requested duration does not exceed the historical duration by a predetermined margin; and setting the determined duration to the historical duration in response to determining that the requested duration exceeds the historical duration by the predetermined margin.

* * * * *